(12) United States Patent
Gerencsér (10) Patent No.: US 9,914,500 B2
(45) Date of Patent: Mar. 13, 2018

(54) KICKSCOOTER WITH DETACHABLE ELECTRIC DRIVE MODULE WITH HUB-CENTER STEERING AND VIBRATION DAMPENING WHEEL

(71) Applicant: GM Global Technology Operations LLC, Detroit, MI (US)

(72) Inventor: Gábor Gerencsér, Székesfehévér (HU)

(73) Assignee: GM Global Technology Operations LLC, Detroit, MI (US)

( * ) Notice: Subject to any disclaimer, the term of this patent is extended or adjusted under 35 U.S.C. 154(b) by 93 days.

(21) Appl. No.: 14/789,586

(22) Filed: Jul. 1, 2015

(65) Prior Publication Data

US 2017/0001683 A1    Jan. 5, 2017

(51) Int. Cl.

| | |
|---|---|
| B62D 61/02 | (2006.01) |
| B62M 13/00 | (2010.01) |
| B62M 13/04 | (2006.01) |
| B62M 6/80 | (2010.01) |
| B60B 9/26 | (2006.01) |
| B62K 3/00 | (2006.01) |
| B62K 15/00 | (2006.01) |
| B62M 6/45 | (2010.01) |
| B60B 19/12 | (2006.01) |
| B62M 6/75 | (2010.01) |
| B60B 1/06 | (2006.01) |

(52) U.S. Cl.
CPC ............ *B62M 6/80* (2013.01); *B60B 9/26* (2013.01); *B60B 19/12* (2013.01); *B62K 3/002* (2013.01); *B62K 15/006* (2013.01); *B62M 6/45* (2013.01); *B62M 6/75* (2013.01); *B60B 1/06* (2013.01); *B60Y 2200/81* (2013.01); *B62K 2202/00* (2013.01); *B62K 2204/00* (2013.01)

(58) Field of Classification Search
CPC ....... A63C 17/22; A63C 17/223; B60C 7/102; B60C 7/105; B62D 7/18; B60G 2206/50; B62B 5/005; B62K 2202/00; B62K 2204/00
See application file for complete search history.

(56) References Cited

U.S. PATENT DOCUMENTS

| | | | | |
|---|---|---|---|---|
| 3,570,620 A | * | 3/1971 | Fisher | B60L 11/1805 180/214 |
| 4,208,073 A | * | 6/1980 | Hechinger | A63C 17/01 152/323 |
| 4,356,875 A | * | 11/1982 | Clune | B62B 3/12 180/13 |

(Continued)

*Primary Examiner* — James A Shriver, II
*Assistant Examiner* — Vaughn Coolman
(74) *Attorney, Agent, or Firm* — BrooksGroup (57) ABSTRACT

A number of variations may include a foldable scooter comprising a first frame component, wherein the first frame component comprises a steering column and a handlebar, wherein the steering column is integrated with an electric drive unit speed controller which is constructed and arranged to operatively control a removeable electric drive module; a second frame component, wherein the second frame component is rotatably attached to the first frame component so that the first frame component can fold onto the second frame component and wherein the second frame component includes a deck; a front wheel operatively connected to the first frame component; and a rear wheel operatively connected to the second frame component.

18 Claims, 4 Drawing Sheets

(56) References Cited

U.S. PATENT DOCUMENTS

| | | | | |
|---|---|---|---|---|
| 4,699,432 A * | 10/1987 | Klamer | A63C 17/22 | 152/210 |
| 4,821,832 A * | 4/1989 | Patmont | B62K 3/002 | 180/208 |
| 5,725,284 A * | 3/1998 | Boyer | A63C 17/223 | 301/5.302 |
| 5,829,757 A * | 11/1998 | Chiang | A63C 17/22 | 280/11.19 |
| 5,873,425 A * | 2/1999 | Yang | B62B 9/00 | 180/216 |
| 6,085,815 A * | 7/2000 | Piper | A63C 17/223 | 152/165 |
| 6,227,622 B1 * | 5/2001 | Roderick | A63C 17/223 | 152/323 |
| 6,572,198 B1 * | 6/2003 | Lai | B60B 5/02 | 301/5.301 |
| 6,629,735 B1 * | 10/2003 | Galy | A63C 17/223 | 301/5.301 |
| 7,040,443 B1 * | 5/2006 | Roth | B62K 3/002 | 180/220 |
| 7,887,077 B2 * | 2/2011 | Thiers | B60G 3/14 | 180/6.24 |
| 8,292,018 B2 * | 10/2012 | Huang | B60B 19/00 | 180/220 |
| 8,297,631 B2 * | 10/2012 | Siebeneick | B60B 3/02 | 280/93.512 |
| 8,365,883 B2 * | 2/2013 | Matsubayashi | B62J 15/00 | 188/206 R |
| 8,746,721 B2 * | 6/2014 | Thiers | B62K 21/00 | 180/219 |
| 8,813,892 B2 * | 8/2014 | Hadley | F16D 49/00 | 180/220 |
| 8,899,368 B2 * | 12/2014 | Ishii | B62K 25/08 | 180/219 |
| 9,045,189 B2 * | 6/2015 | Lovley, II | B62K 3/002 | |
| 9,073,594 B2 * | 7/2015 | Sluijter | B62K 11/10 | |
| 9,302,728 B1 * | 4/2016 | Yang | B62K 15/006 | |
| 9,352,765 B2 * | 5/2016 | Vashdi | B62B 9/22 | |
| 9,433,852 B2 * | 9/2016 | Colon | A63C 17/22 | |
| 9,440,698 B2 * | 9/2016 | Dadoosh | B62K 3/002 | |
| 9,493,206 B1 * | 11/2016 | Oh | B62K 15/006 | |
| 9,660,500 B2 * | 5/2017 | Huang | B62M 6/65 | |
| 2005/0218712 A1 * | 10/2005 | Beaumier | A63C 17/22 | 301/5.308 |
| 2008/0179940 A1 * | 7/2008 | Hill | B60O 7/102 | 301/105.1 |
| 2009/0308676 A1 * | 12/2009 | Wang | B62K 5/007 | 180/208 |
| 2010/0230022 A1 * | 9/2010 | Kim | B60O 7/102 | 152/310 |
| 2013/0153322 A1 * | 6/2013 | Constin | B62B 1/002 | 180/212 |
| 2013/0319591 A1 * | 12/2013 | Van De Wiele | B60O 7/10 | 152/246 |
| 2014/0326374 A1 * | 11/2014 | Cron | B60O 7/102 | 152/5 |
| 2015/0209205 A1 * | 7/2015 | Ransenberg | B62K 15/008 | 280/641 |
| 2016/0046153 A1 * | 2/2016 | Yoo | B60O 7/102 | 152/1 |
| 2016/0184691 A1 * | 6/2016 | Seo | B60B 33/00 | 301/5.308 |

\* cited by examiner

Fig.14

US 9,914,500 B2

KICKSCOOTER WITH DETACHABLE ELECTRIC DRIVE MODULE WITH HUB-CENTER STEERING AND VIBRATION DAMPENING WHEEL

TECHNICAL FIELD

The field to which the disclosure generally relates to includes scooters.

SUMMARY OF ILLUSTRATIVE VARIATIONS

A number of variations may include a foldable scooter comprising: a first frame component, wherein the first frame component comprises a steering column and a handlebar, wherein the steering column is integrated with an electric drive unit speed controller which is constructed and arranged to operatively control a removeable electric drive module; a second frame component, wherein the second frame component is rotatably attached to the first frame component so that the first frame component can fold onto the second frame component and wherein the second frame component includes a deck; a front wheel operatively connected to the first frame component; and a rear wheel operatively connected to the second frame component.

A number of variations may include a foldable scooter comprising: a frame, wherein the frame comprises a first frame component and a second frame component, wherein the first frame component is constructed and arranged to form a steering column and a handlebar and is operatively attached to a front hub of a front wheel and wherein the second frame component includes a deck portion and is operatively attached to a rear hub of a rear wheel; a knuckle joint located within the front hub which is operatively attached to the first frame component and the second frame component, and which is constructed and arranged so that rotation of the handlebar around a vertical axis controls the direction of the foldable scooter; and wherein the first frame component and the second frame component are constructed and arranged so that the first frame component can fold onto the second frame component.

A number of variations may include an integrated hub comprising a rim, wherein the rim comprises a torsional element and includes a plurality of cutouts constructed and arranged to allow for radial flexibility, and wherein a soft resin is molded into the plurality of cutouts to limit the flexibility of the rim and to prevent overload and distortion of the rim.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 3:
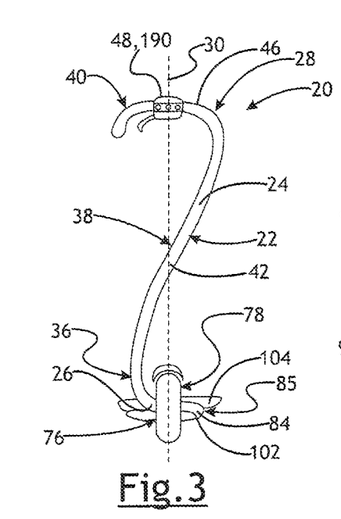
FIG. 3 illustrates a front view of a scooter according to a number of variations.
Figure 4:
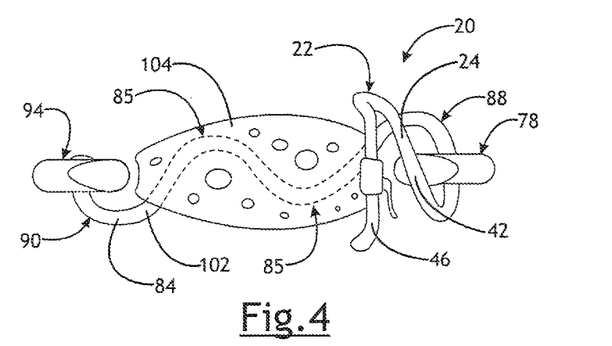
FIG. 4 illustrates a top view of a scooter according to a number of variations.

FIGS. 1-14 illustrate a number of variations including a scooter 20. In a number of variations, a scooter 20 may include a frame 22. Referring to FIGS. 1-4, in a number of variations, the frame 22 may include a first frame component 24 and a second frame component 84. The first frame component 24 may be operatively connected to the front hub 76 and may be used to control the steering of the scooter 20, as will be discussed hereafter. A first end 26 of the first frame component 24 may extend axially outward from the front hub 76 of a front wheel 78 and may include a first curve 36 which may curve upward and across a center vertical axis 30 of the scooter 20 (when viewing the scooter 20 from the front) which may form the steering column 42 of the scooter 20, a variation of which is illustrated in FIG. 3. The first frame component 24 may further include a second end 28 which may include a second bend or curve 38 so that a portion of the first frame component 24 extends approximately horizontal toward and through the center vertical axis 30 of the scooter 20 and may form the handlebar 46 of the scooter 20, a variation of which is also illustrated in FIG. 3. The handlebar 46 may be constructed and arranged so that a rider may grip onto the handlebar 46 for balance and so that a rider may control the direction of the scooter 20 by rotating the handlebar 46 about the central vertical axis 30.

In a number of variations, the handlebar 46 may include a third bend or curve 40 which may align with a speed controller 48, 190 which may also be attached to the handlebar 46, as will be discussed hereafter. In a number of variations, the first frame component 24 may be one single continuous and unitary component.

Figures 1, 2:
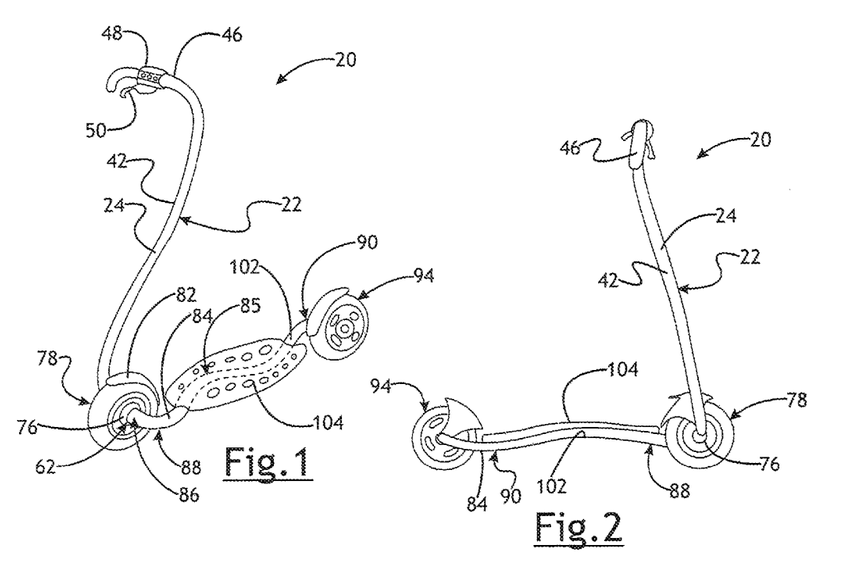
FIG. 1 illustrates a perspective view of a scooter according to a number of variations.
FIG. 2 illustrates a side view of a scooter according to a number of variations.
Figures 5, 6:
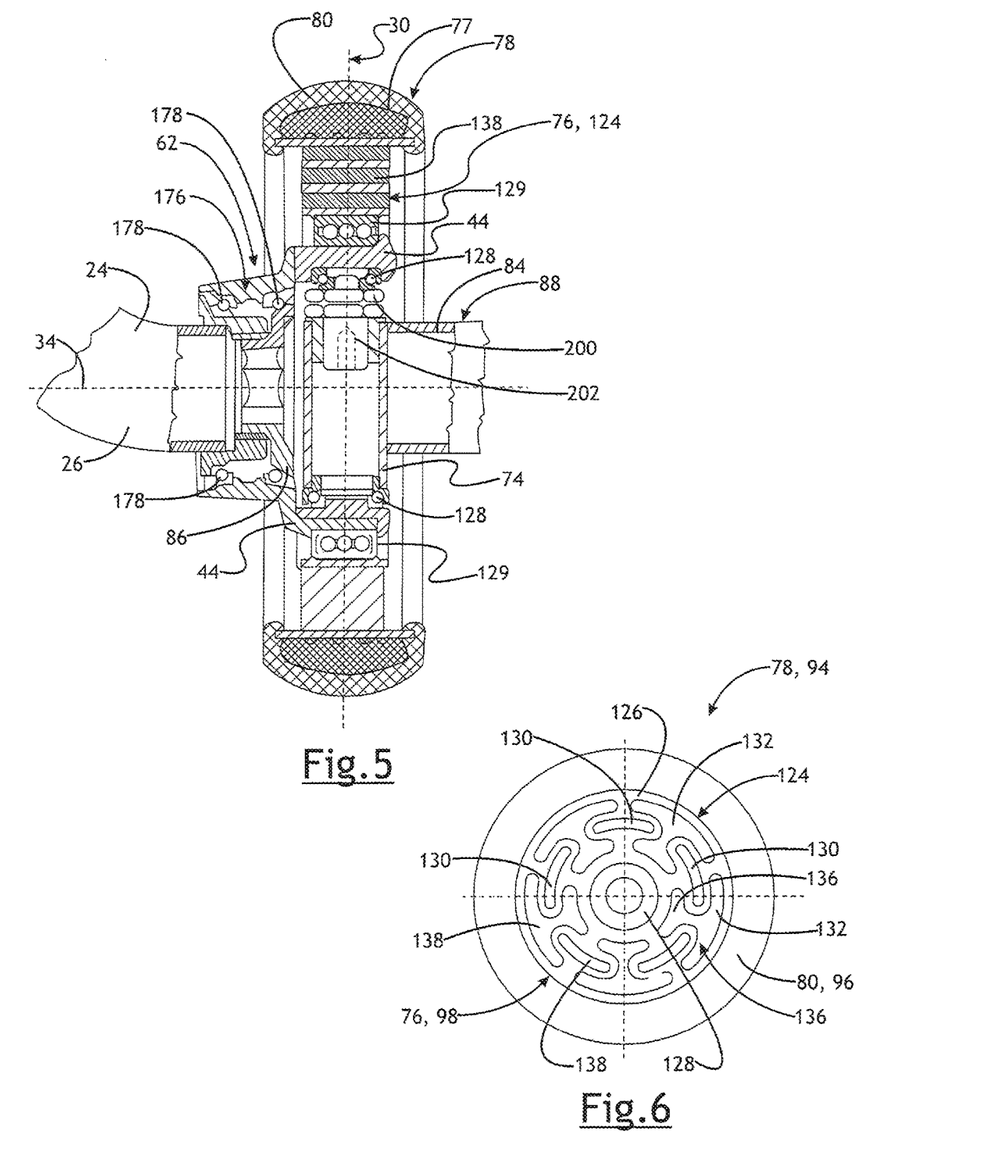
FIG. 5 illustrates a section view of a front wheel according to a number of variations.
FIG. 6 illustrates a side view of an integrated hub according to a number of variations.
Figure 7:
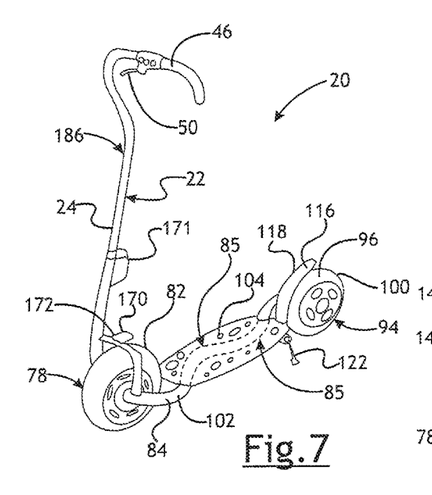
FIG. 7 illustrates a perspective view of a scooter according to a number of variations.

Referring to FIG. 5, in a number of variations, the first end 26 of the first frame component 24 may be attached to or may be integrated with a fork component 44 which may be operatively attached to the front hub 76 through one or more bearings 129 including, but not limited to, roller bearings, so that the front hub 76 may rotate around the fork component 44. In one variation, the front hub 76 may be an integrated hub 124 which may provide vibration dampening, as will be discussed below. A front tire 80 may surround an outer portion 77 of the front hub 76. The second frame component 84 may be attached to a vertical tube 74 or may be integrated with the vertical tube 74. In a number of variations, the first frame component 24 and the front hub 76 may rotate around the vertical tube 74 through the use of a bearing 128, including, but not limited to, a roller bearing, and may form a knuckle joint 62 between the first frame component 24 and the second frame component 84. In a number of variations, a rider may rotate the handlebar 46 about the central vertical axis 30 which may rotate the steering column 42 to control the direction of the front wheel 78. In a number of variations, an adjustment feature 198 may be operatively attached the bearing 128 for vertical adjustment of the bearing 128. The adjustment feature 198 may include one or more hexagonal screws 200 which may extend into a vertical thread 202 and may be locked in place by a nut. Referring to FIGS. 1 and 7, in a number of variations, a front wheel cover 82 may be attached to the first frame component 24 and may surround a portion of the front wheel 78. The front wheel cover 82 may protect the front wheel 78 from contaminants.

Figure 9:
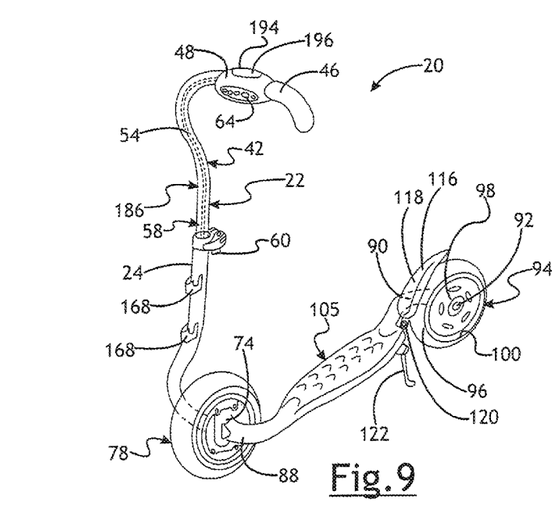
FIG. 9 illustrates a perspective view of a scooter according to a number of variations.

Referring to FIGS. 1-3, and 7, in a number of variations, the second frame component 84 may include a first end 88 and a second end 90. The first end 88 may be attached to a vertical tube 74 of the knuckle joint 62 as discussed above. In a number of variations, the second end 90 may be operatively connected to a rear axle 92 or may be integrated as the rear axle 92, a variation of which is illustrated in FIG. 9. In a number of variations, the rear axle 92 may extend axially through the rear hub 98 of the rear wheel 94. A rear tire 96 may surround the outer portion 100 of the rear hub 98, a variation of which is also illustrated in FIG. 9.

Figure 8:
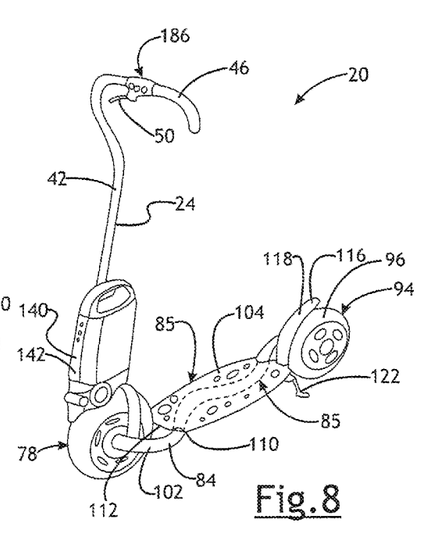
FIG. 8 illustrates a perspective view of a scooter according to a number of variations.

Referring to FIGS. 1-4, 7, and 8, in a number of variations, the second frame component 84 may be constructed and arranged to act as a deck bar 102 to support a deck 104. The second frame component 84 may include one or more curves 85 which may provide a base to support the deck 104, a variation of which is illustrated in FIG. 7. The deck 104 may be attached to the deck bar 102 in any number of variations including, but not limited to, one or more mechanical fasteners and/or welding. The deck 104 may be constructed and arranged in any number of variations to support a rider. In one variation, the deck 104 may be oval in shape. In a number of variations, the deck 104 may include an indentation or cutout 110 which may contour the shape of a portion of the deck bar 102, a variation of which is illustrated in FIG. 8. A first end 106 and/or the second end 108 of the deck 104 may also include a cutout out or curved end 112 which may accommodate a portion of the front and/or rear wheels 78, 94, a variation of which is illustrated in FIG. 8.

Figure 10:
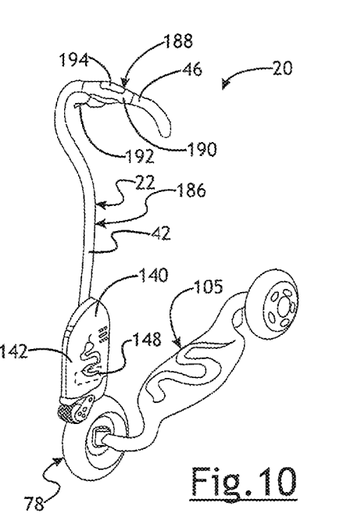
FIG. 10 illustrates a perspective view of a scooter according to a number of variations.

Referring to FIGS. 9 and 10, in another variation, the second frame component 84 may comprise an integrated deck 105, wherein the deck bar and the deck may be one continuous and uniform component. The integrated deck 105 may be formed in any number of variations. In one variation, the integrated deck 105 may be formed by using a hydroforming process on the deck bar. The integrated deck 105 may then be filled with a foam filler.

Referring to FIGS. 7-9, in a number of variations, a braking mechanism 116 may be operatively connected to the rear wheel 94 and may be used to slow down and/or stop the scooter 20. In one variation, the braking mechanism 116 may be a pad 118 which may be aligned with the rear tire 96 and may be pivotably attached to the deck 104, 105 so that a rider may step backward onto the pad 118 to cause the pad 118 to rub against the rear tire 96 which may slow down or prevent rotation of the rear wheel 94 which may slow down and/or stop the scooter 20 from traveling. The brake pad 118 may be attached to the scooter 20 in any number of variations including, but not limited to, one or more mechanical fasteners 120, a variation of which is illustrated in FIG. 9. The brake pad 118 may surround a portion of the rear wheel 94 and may also be constructed and arranged to protect the rear wheel 94 from contaminants Also referring to FIGS. 7-9, in a number of variations, a kick stand 122 may be rotatably attached to the deck 104, 105 and may be constructed and arranged to support the scooter 20 in an upright position when the scooter 20 may be stationary. The kick stand 122 may also be rotated upward so that it does not touch the ground while the scooter 20 is being ridden.

Referring to FIG. 6, in a number of variations, the front and/or rear wheel assemblies 78, 94 may include an integrated hub 124 which may be constructed and arranged so that it may provide vibration dampening of the scooter 20. In a number of variations, the integrated hub 124 may include a rim 126 which may be connected to and may surround the outer perimeter of a bearing 129 including, but not limited to, a double roller bearing, a variation of which is illustrated in FIG. 5. The rim 126 may include various cutouts 130, 132 which may vary in size. In one variation, the rim 126 may include a first set of cutouts 130 which may be any number of shapes including, but not limited to, oblong and which may extend around a central portion of the rim 126 and may collectively form a circular shape. The rim 126 may also include a second set of cutouts 132 which may be dispersed between each of the first set of cutouts 130 and may include a first portion 134 which extends above the first plurality of cutouts 130 and a second portion 136 which extends below the first plurality of cutouts 130. Any number of shapes of cutouts may be used which may allow for radial flexibility. In a number of variations, the rim 126 may comprise a torsional element and the various cutouts 130, 132 in the rim 126 may be filled with a soft resin 138 including, but not limited to, a silicon filling. The integrated hub 124 may be formed in a number of variations including, but not limited to, injection molding. A tire 80, 96 may surround the integrated hub 124 and may comprise a rubber. The integrated hub 124 may allow for radial dampening while maintaining axial rigidity which may limit flexibility of the wheel assembly 78, 94 and may prevent overload and distortion of the wheel assembly 78, 94. In one variation, the tire 80, 96 may not require air, which may also increase the durability of the wheel 78, 94.

Figure 14:
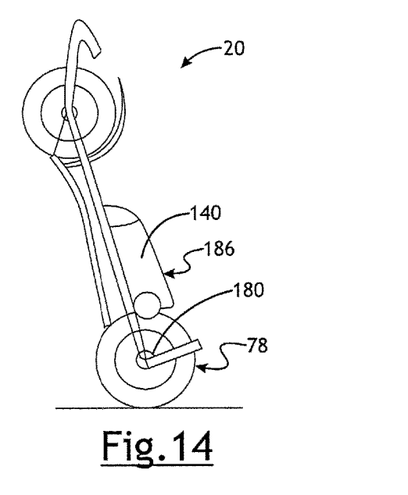
FIG. 14 illustrates a side view of a scooter in a folded position according to a number of variations.

Referring to FIG. 5, in a number of variations, the front hub 76 may also be integrated with a folding mechanism 176 which may enable the first frame component 24 to fold downward and around the horizontal axis 34 so that it may be aligned with the second frame component 84. In one variation, the folding mechanism 176 may include one or more bearings 178 which may be attached between the first frame component 24 and the fork component 44, which may allow the first frame component 24 to fold downward around the horizontal axis 34, a variation of which is illustrated in FIG. 5. The scooter 20 may also include one or more locking mechanisms 180 which may lock the scooter 20 in the folded position, a variation of which is illustrated in FIG. 14. This may enable a rider to tow the scooter 20 on its front wheel 78.

Referring to FIGS. 8-12, in a number of variations, the steering column 42 may be integrated with an electric drive unit 186 which may be constructed and arranged to mate with a detachable electronic drive module (E-module) 140 so that the scooter 20 may be electrically propelled. In one variation, the electric drive unit 186 may comprise a wireless system 188 which may include a speed controller 190 which may be located on the handlebar 46, a variation of which is illustrated in FIG. 10. The speed controller 190 may be battery powered and may transmit signals or waves to an electric motor controller 148 in the E-module 140 so that a rider may control the speed of the scooter 20 by controlling the speed of the electric motor 152. In a number of variations, the speed controller 190 may also be constructed and arranged to receive signals or waves from the E-module 140 to indicate the speed of the electric motor 152 and/or the battery life of the electric motor battery 146. In a number of variations, the speed controller 190 may be part of or may be a general purpose or specific purpose computer. In one variation, the speed controller 190 may include a plurality of buttons, knobs 192, or a thumb control 50, a variation of which is illustrated in FIG. 7, which may allow a rider to increase or decrease the speed of the electric motor 152. The speed controller 190 may also include a digital screen 194 which may display the speed of the scooter 20 and/or the battery life of the electric motor battery 146 and/or the speed control device battery. In another variation, the speed controller 190 may include a touch screen 196 (a variation of which is illustrated in FIG. 9) which may allow a rider to touch the screen to change the speed of the electric motor 152. In one variation, the speed controller 190 may also receive signals or waves from the electric motor controller 148 to display the speed of the electric motor 152 and/or the battery life of the electric motor battery 146 and/or the touch screen battery onto the touch screen 196.

Figure 12:
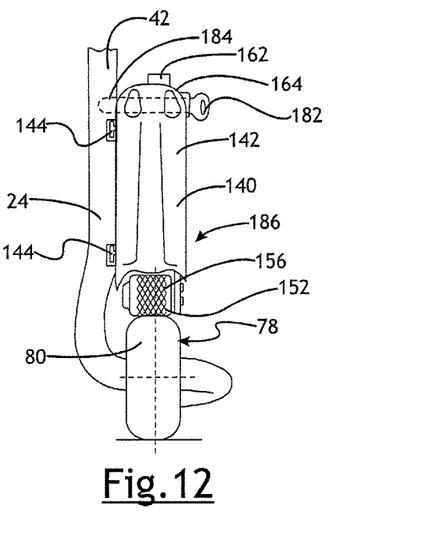
FIG. 12 illustrates a close-up front view of a front wheel and electric motor assembly according to a number of variations

Referring to FIG. 9, in another variation, the electric drive unit 186 may not be wireless and may include one or more cables 54 which may extend within the steering column 42. In a number of variations, the first end 56 of the one or more cables 54 may be attached to a speed controller 48 which may be operatively attached to the handlebar 46. In a number of variations, the second end 58 of the one or more cables 54 may include a speed controller connector 60, a variation of which is illustrated in FIG. 9, which may be constructed and arranged to electrically attach to an E-module connector 162, a variation of which is illustrated in FIG. 12, so that the speed controller 48 may send and receive signals to and from the electric motor controller 148. In a number of variations, the speed controller 48 may be part of or may be a general purpose or specific purpose computer. In a number of variations, the speed controller 48 may be thumb control 50, a variation of which is illustrated in FIG. 8, which may be used to increase or decrease the speed of the electric motor 152. In another variation, the speed controller 48 may include one or more buttons or knobs 64 which may be used to control the speed of the electric motor 152. In a number of variations, the speed controller 48 may also include a digital screen 194 which may display the speed and/or battery life of the electric motor battery 146. In another variation, the speed controller 48 may comprise a touch screen 196, a variation of which is illustrated in FIG. 9, which may allow a rider to adjust the speed of the electric motor 152 by touching the screen 196 and may display the speed of the electric motor 152 and/or the battery life of the electric motor battery 146.

In a number of variations, the scooter 20 may be constructed and arranged so that a rider may easily attach the E-module 140 to the scooter 20 if the rider requires use of the electric powertrain and so that the rider may also easily remove the E-module 140 if the rider prefers to manually propel the scooter 20 in a kick mode. The construction of the attachable E-module 140 may allow for a decreased weight of the scooter 20 when the E-module 140 may be removed so that a rider manually propelling the scooter 20 in a kick mode will not be adversely affected by the weight of the electrical powertrain.

Figure 11:
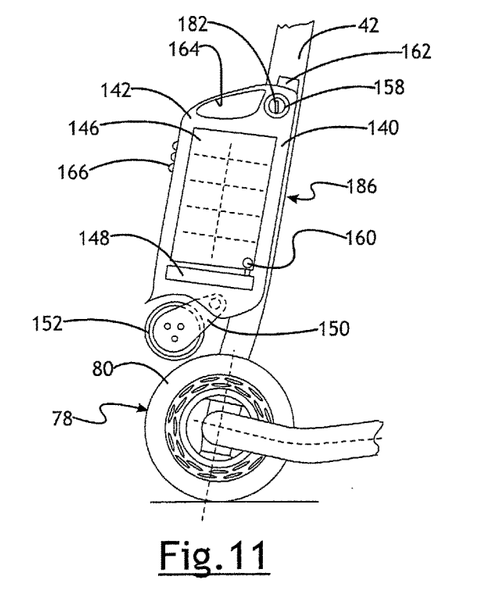
FIG. 11 illustrates a close-up side view of a front wheel and an electric drive module according to a number of variations.

In a number of variations, the E-module 140 may provide a friction drive which may be used to rotate the front wheel 78. The E-module 140 may comprise a housing 142, a battery pack 146, an electric motor controller 148, a pivot arm 150, an electric motor 152, a locking device 158, a charger point 160, and an E-module connector 162 (if required), a variation of which is illustrated in FIG. 11. The battery pack 146 may be operatively attached to the electric motor 152 and may be used to power the electric motor 152. The battery pack 146 may be chargeable and may include a charger point 160 which may allow the battery pack 146 to be charged from an outside power unit/source. The electric motor controller 148 may be operatively attached to the electric motor 152 and may be used to control the operation of the electric motor 152. Any number of electric motors 152 may be used including, but not limited to, an outrunner motor having a rotor and a stator. In a number of variations, the electric motor controller 148 may include electronic processing components to receive input signals from the speed controller 48, 190 to control the speed of the motor 152. The electric motor controller 148 may include memory, a processor, and/or software or hardware to process the signals. In a number of variations, the electric motor controller 148 may be part of or may be a general purpose or specific purpose computer. The electric motor controller 148, may be used to vary the speed, direction, and/or braking of the electric motor 152 by switching the polarity of each pole, each time a magnet on the rotor of the motor 152 passes the pole on the stator. When the polarity is switched, the magnet is attracted to the next pole and may repel the last pole which it passed. This may cause the rotor to rotate within the stator. This process is repeated for the duration that power is supplied to the electric motor 152 which may drive the electric motor 152. In a number of variations, the housing 142 may enclose at least a portion of the battery pack 146, electric motor controller 148, electric motor 152, locking device 158, charger point 160, and E-module connector 162 (if required). In a number of variations, the electric motor 152 may be attached to the pivot arm 150 which may be attached to the E-module housing 142.

In a number of variations, when the E-module 140 is attached to the scooter 20, the speed controller 48, 190 may control the electric motor controller 148 so that the rider may control the speed of the scooter 20 with the speed controller 48, 190. The electric motor 152 may be operatively connected to the front tire 80 and may be used as a friction drive to drive/rotate the front tire 80. The electric motor 152 may include various hash lines 156 which may increase the friction between the motor 152 and the front tire 80, a variation of which is illustrated in FIG. 12. The E-module 140 may be locked onto the scooter 20 with the locking device 158, as will be discussed hereafter.

In one variation, the E-module housing 142 may include a handle 164 which may be attached to or integrated with the E-module housing 142, a variation of which is illustrated in FIG. 11. The handle 164 may allow a rider to easily transport the E-module 140. The E-module 140 may also include one or more lights 166 which may be electrically connected to the E-module 140 which may indicate whether the E-module 140 is ON, OFF, or charging, a variation of which is also illustrated in FIG. 11.

Figure 13:
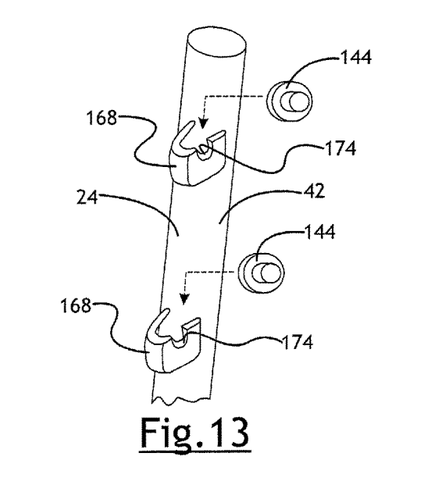
FIG. 13 illustrates a close-up perspective view of an attachment system for an electric drive module according to a number of variations.

Referring to FIGS. 9 and 13, in one variation, the first frame component 24 may include a plurality of brackets 168 which may be constructed and arranged so that the E-module 140 may be quick fixed to the steering column 42. The plurality of brackets 168 may be spaced a distance from each other and may include a cutout 174 which may be constructed and arranged to mate with one or more protrusions 144 on the E-module housing 142. In one variation, two brackets 168 and two protrusions 144 may be used. The protrusions 144 on the E-module housing 142 may be inserted above the cutouts 174 on the brackets 168 and may sit within the brackets 168. Referring to FIG. 12, in another variation, the first frame component 24 may include one or more openings which may accept the one or more protrusions 144 on the E-module housing 142.

Referring to FIGS. 7 and 10, in another variation, the first frame component 24 and the second frame component 84 may each be constructed and arranged to accommodate the E-module 140. In one variation, the first frame component 24 and the second frame component 84 may include one or more brackets 170, 171 which may be constructed and arranged so that the E-module 140 may be quick fixed to the steering column 42. In one variation, a first bracket component 170 may extend from the second frame component 84 and may curve over a portion of the front wheel 78. The first bracket component 170 may include a base 172 which may sit approximately central over the front wheel 78 and may be constructed and arranged so that a bottom surface of the E-module housing 142 may sit on the base 172. A second bracket assembly 171 may be attached to the steering column 42 of the first frame component 24 and may be used to attach a side surface of the E-module housing 142 to the scooter 20. The E-module connector 162 may then be attached to the speed controller connector 60 (if it is not wireless) so that the scooter 20 may be electrically powered. The E-module 140 may be disconnected from the scooter 20 by disconnecting the E-module connector 162 from the throttle connector 60 and removing the E-module 140 from the one or more brackets 170, 171.

In a number of variations, a locking device 158 may include an opening 184 which may extend through the E-module 140 and through a portion of the first frame component 24. A key 182 may be inserted into the opening 184 and may be rotated to lock the E-module 140 to the first frame component 24.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a foldable scooter comprising: a first frame component, wherein the first frame component comprises a steering column and a handlebar, wherein the steering column is integrated with an electric drive unit speed controller which is constructed and arranged to operatively control a removeable electric drive module; a second frame component, wherein the second frame component is rotatably attached to the first frame component so that the first frame component can fold onto the second frame component and wherein the second frame component includes a deck; a front wheel operatively connected to the first frame component; and a rear wheel operatively connected to the second frame component.

Variation 2 may include a foldable scooter as set forth in Variation 1 further comprising a removable electric drive module, wherein the electric drive module comprises a battery, a motor, a motor controller, a pivot arm, a charger point, and a housing which surrounds at least a portion of the battery, the motor, the controller, the pivot arm, and the charger point; and wherein the electric drive module is attached to the foldable scooter and controlled by the electric drive unit speed controller.

Variation 3 may include a foldable scooter as set forth in any of Variations 1-2 wherein the electric drive unit speed controller wirelessly controls the motor controller.

Variation 4 may include a foldable scooter as set forth in any of Variations 1-2 wherein the electric drive unit speed controller is electrically connected to the motor controller through one or more cables.

Variation 5 may include a foldable scooter as set forth in any of Variations 1-4 further comprising at least one electric drive module bracket attached to at least one of the first frame component or the second frame component.

Variation 6 may include a foldable scooter as set forth in any of Variations 1-5 wherein the first frame component and the second frame component form a knuckle joint constructed and arranged so that the handlebar controls the direction of the scooter.

Variation 7 may include a foldable scooter as set forth in any of Variations 1-6 wherein the deck is integrated with the deck bar so that it is one single continuous and uniform component.

Variation 8 may include a foldable scooter as set forth in any of Variations 1-6 wherein the deck is a separate component which is attached to the deck bar.

Variation 9 may include a foldable scooter as set forth in any of Variations 1-8 wherein at least one of the front wheel or the rear wheel comprises an integrated hub, wherein the integrated hub comprises a rim, wherein the rim comprises a first set of cutouts and a second set of cutouts which are spaced circumferentially around the rim, wherein the rim comprises a first material and the first and second cutouts are filled with a second material, and wherein the first material is harder than the second material, and wherein the integrated hub is constructed and arranged to reduce vibrations while maintaining axial rigidity.

Variation 10 may include a foldable scooter as set forth in any of Variations 1-9 wherein the foldable scooter is constructed and arranged so that when the foldable scooter is in a folded position the foldable scooter may be towed on the front wheel.

Variation 11 may include a foldable scooter comprising: a frame, wherein the frame comprises a first frame component and a second frame component, wherein the first frame component is constructed and arranged to form a steering column and a handlebar and is operatively attached to a front hub of a front wheel and wherein the second frame component includes a deck portion and is operatively attached to a rear hub of a rear wheel; a knuckle joint located within the front hub which is operatively attached to the first frame component and the second frame component, and which is constructed and arranged so that rotation of the handlebar around a vertical axis controls the direction of the foldable scooter; and wherein the first frame component and the second frame component are constructed and arranged so that the first frame component can fold onto the second frame component.

Variation 12 may include a foldable scooter as set forth in Variation 11 wherein the foldable scooter is constructed and arranged so that in a folded position the foldable scooter can be towed on the front wheel.

Variation 13 may include a foldable scooter as set forth in any of Variations 11-12 wherein the deck portion is a deck integrated with a deck bar so that it is one single continuous and uniform component.

Variation 14 may include a foldable scooter as set forth in Variation 13 wherein the deck portion is formed by hydroforming and is filled with a foam filler.

Variation 15 may include a foldable scooter as set forth in any of Variations 11-12 wherein the deck portion includes a deck and a deck bar, and wherein the deck is a separate component from the deck bar and is attached to the deck bar.

Variation 16 may include a foldable scooter as set forth in any of Variations 11-15 wherein at least one of the front wheel or the rear wheel comprises an integrated hub, wherein the integrated hub comprises a rim, wherein the rim comprises a first set of cutouts and a second set of cutouts which are spaced circumferentially around the rim, wherein the rim comprises a first material and the first and second cutouts are filled with a second material, and wherein the first material is harder than the second material.

Variation 17 may include a foldable scooter as set forth in Variation 16 wherein a tire surrounds the integrated hub, and wherein the integrated hub is constructed and arranged to reduce vibrations while maintaining axial rigidity.

Variation 18 may include a foldable scooter as set forth in any of Variations 11-17 wherein the foldable scooter comprises an electronic drive system comprising: an electric drive controller operatively attached to the handlebar; a removeable electric drive module comprising an electric motor, a battery operatively connected to the electric motor, and an electric motor controller operatively connected to the electric motor to control the speed of the motor; and wherein the electric drive controller is operatively connected to the electric motor controller to control the electric motor controller.

Variation 19 may include a foldable scooter as set forth in Variation 18 wherein the removable electric drive module is attached to the foldable scooter through one or more brackets.

Variation 20 may include an integrated hub comprising a rim, wherein the rim comprises a torsional element and includes a plurality of cutouts constructed and arranged to allow for radial flexibility, and wherein a soft resin is molded into the plurality of cutouts to limit the flexibility of the rim and to prevent overload and distortion of the rim.

The above description of select variations within the scope of the invention is merely illustrative in nature and, thus, variations or variants thereof are not to be regarded as a departure from the spirit and scope of the invention.

What is claimed is:

1. A foldable scooter comprising:
    a first frame component, wherein the first frame component comprises a steering column and a handlebar, wherein the steering column is integrated with an electric drive unit speed controller which is constructed and arranged to operatively control a removeable electric drive module;
    a second frame component, wherein the second frame component is rotatably attached to the first frame component so that the first frame component can fold onto the second frame component and wherein the second frame component includes a deck;
    a front wheel operatively connected to the first frame component;
    a rear wheel operatively connected to the second frame component; and
    wherein the first frame component and the second frame component form a knuckle joint constructed and arranged so that the handlebar controls the direction of the scooter.

2. The foldable scooter of claim 1 further comprising a removable electric drive module, wherein the electric drive module comprises a battery, a motor, a motor controller, a pivot arm, a charger point, and a housing which surrounds at least a portion of the battery, the motor, the controller, the pivot arm, and the charger point; and wherein the electric drive module is attached to the foldable scooter and controlled by the electric drive unit speed controller.

3. The foldable scooter of claim 1 wherein the electric drive unit speed controller wirelessly controls a motor controller.

4. The foldable scooter of claim 1 wherein the electric drive unit speed controller is electrically connected to a motor controller through one or more cables.

5. The foldable scooter of claim 1 further comprising at least one electric drive module bracket attached to at least one of the first frame component or the second frame component.

6. The foldable scooter of claim 1 wherein the foldable scooter is constructed and arranged so that when the foldable scooter is in a folded position the foldable scooter may be towed on the front wheel.

7. The foldable scooter of claim 1 wherein the deck is integrated with a deck bar so that it is one single continuous and uniform component.

8. The foldable scooter of claim 1 wherein the deck is a separate component which is attached to a deck bar.

9. The foldable scooter of claim 1 wherein at least one of the front wheel or the rear wheel comprises an integrated hub, wherein the integrated hub comprises a rim, wherein the rim comprises a first set of cutouts and a second set of cutouts which are spaced circumferentially around the rim, wherein the rim comprises a first material and the first and second cutouts are filled with a second material, and wherein the first material is harder than the second material, and wherein the integrated hub is constructed and arranged to reduce vibrations while maintaining axial rigidity.

10. A foldable scooter comprising:
    a frame, wherein the frame comprises a first frame component and a second frame component, wherein the first frame component is constructed and arranged to form a steering column and a handlebar and is operatively attached to a front hub of a front wheel and wherein the second frame component includes a deck portion and is operatively attached to a rear hub of a rear wheel;
    a knuckle joint located within the front hub which is operatively attached to the first frame component and the second frame component, and which is constructed and arranged so that rotation of the handlebar around a vertical axis controls the direction of the foldable scooter; and wherein the first frame component and the second frame component are constructed and arranged so that the first frame component can fold onto the second frame component.

11. The foldable scooter of claim 10 wherein the deck portion is a deck integrated with a deck bar so that it is one single continuous and uniform component.

12. The foldable scooter of claim 11 wherein the deck portion is formed by hydroforming and is filled with a foam filler.

13. The foldable scooter of claim 10 wherein at least one of the front wheel or the rear wheel comprises an integrated hub, wherein the integrated hub comprises a rim, wherein the rim comprises a first set of cutouts and a second set of cutouts which are spaced circumferentially around the rim, wherein the rim comprises a first material and the first and second cutouts are filled with a second material, and wherein the first material is harder than the second material.

14. The foldable scooter of claim 13 wherein a tire surrounds the integrated hub, and wherein the integrated hub is constructed and arranged to reduce vibrations while maintaining axial rigidity.

15. The foldable scooter of claim 10 wherein the foldable scooter comprises an electronic drive system comprising: an electric drive controller operatively attached to the handlebar; a removeable electric drive module comprising an electric motor, a battery operatively connected to the electric motor, and an electric motor controller operatively connected to the electric motor to control the speed of the motor; and wherein the electric drive controller is operatively connected to the electric motor controller to control the electric motor controller.

16. The foldable scooter of claim 15 wherein the removable electric drive module is attached to the foldable scooter through one or more brackets.

17. The foldable scooter of claim 10 wherein the foldable scooter is constructed and arranged so that in a folded position the foldable scooter can be towed on the front wheel.

18. The foldable scooter of claim 10 wherein the deck portion includes a deck and a deck bar, and wherein the deck is a separate component from the deck bar and is attached to the deck bar.

* * * * *